United States Patent
Zhang

(10) Patent No.: US 7,507,345 B2
(45) Date of Patent: Mar. 24, 2009

(54) SOY PROTEINS AND/OR SOY DERIVATIVES WITH ZERO-VALENT IRON COMPOSITIONS AND USE FOR ENVIRONMENTAL REMEDIATION

(75) Inventor: Wei-xian Zhang, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 0 days.

(21) Appl. No.: 11/843,970

(22) Filed: Aug. 23, 2007

(65) Prior Publication Data

US 2008/0047906 A1    Feb. 28, 2008

Related U.S. Application Data

(60) Provisional application No. 60/823,408, filed on Aug. 24, 2006.

(51) Int. Cl.
*C02F 1/68* (2006.01)
*B01F 3/00* (2006.01)

(52) U.S. Cl. .................... 210/763; 210/747; 252/363.5; 502/338

(58) Field of Classification Search ............... 210/632, 210/757, 749, 192, 501, 503, 504, 506, 747; 405/128.75; 419/64; 252/363.5; 106/124.1; 427/216; 502/338
See application file for complete search history.

(56) References Cited

U.S. PATENT DOCUMENTS 5,418,010 A * 5/1995 Janda et al. ............... 427/213.3
7,128,841 B2 * 10/2006 Zhang ........................ 210/747

OTHER PUBLICATIONS

Chu, et al. "Rapid in Situ Dechlorination of Solvents by Abiotic and Biotic Mechanisms" Jun. 2005, Battelle Press.*
Mantha et al. "Removal of nitroaromatics from synthetic wastewater using two-step ZVI reduction and peroxidase-catalyzed oxidative polymerization"2002, Water Environment Federation.*

* cited by examiner

*Primary Examiner*—Matthew O Savage
*Assistant Examiner*—Lucas Stelling
(74) *Attorney, Agent, or Firm*—Design IP

(57) ABSTRACT

Preparation of dispersions of zero-valance nanoscale iron particles and one of soy protein, soy milk, or other soy derivative. The dispersions can be used to treat contaminated soil or water.

4 Claims, No Drawings

SOY PROTEINS AND/OR SOY DERIVATIVES WITH ZERO-VALENT IRON COMPOSITIONS AND USE FOR ENVIRONMENTAL REMEDIATION

CROSS REFERENCE TO RELATED APPLICATION(S)

This application claims priority from 60/823,408, filed Aug. 24, 2006, which is incorporated by reference as if fully set forth.

FIELD OF INVENTION

This invention relates to the treatment and remediation of contaminated soil and groundwater with a combination of zero-valent iron particles and soy proteins or other soy derivatives.

BACKGROUND

In the past decade the use of metallic or zero-valent iron (ZVI) in the form of iron fillings or powders for the reduction of halogenated organic contaminants such carbon tetrachloride (CT, $CCL_4$), chloroform (CF, $CHCl_3$), trichloroethylene (TCE, $C_2HCl_3$), and tetrachloroethene (PCE, $C_2Cl_4$) for environmental remediation has emerged. Iron is a moderate reducing reagent. Reactions of iron with dissolved oxygen and to some extent with water are the main reactions in classical electrochemistry (e.g., corrosion). The corrosion reactions can be inhibited or accelerated by manipulating solution chemistry and/or solid (metal) composition. This is echoed in the transformation of hazardous and toxic chemicals in which iron oxidation is coupled to the contaminant reduction. For example, tetrachloroethene ($C_2Cl_4$), a common solvent, can accept electrons from iron oxidation and be reduced to ethane in accordance with the following reaction:

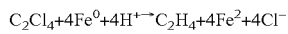

$$C_2Cl_4 + 4Fe^0 + 4H^+ \rightarrow C_2H_4 + 4Fe^{2+} + 4Cl^-$$

Environmental applications of metallic iron have been enthusiastically accepted by many users and regulatory agencies, largely due to the low cost and absence of any known toxicity induced by iron.

So far, the main approach for the application of zero-valent iron in environmental remediation is to build in-ground barriers filled with zero-valent iron. Barriers containing zero-valent iron are typically installed across the flow path of groundwater. When the contaminated water passes through the reactive or adsorptive materials, contaminants in the water are removed by various physical and chemical mechanisms. Such treatment barriers are often called "permeable reactive barriers" (PRBs) as the barriers are usually more water permeable than the native soil/sediment materials. Examples of such techniques are remediants are disclosed in U.S. Pat. Nos. 5,624,552; 5,759,389; 6,242,663 B1; and 6,287,472 B1 and U.S. Patent Application Publication No. US 2003/0134409 A1.

It should be noted that permeable reactive barriers are often installed in the downstream direction of the contaminated plume flow or development to contain the spread of the contaminant plume. This represents a passive approach for site remediation as the contaminant source(s) can not be treated directly. Iron is heavy (7,800 kg/m.sup.3) so that large amounts of iron are needed to construct an iron permeable reactive barrier. Furthermore, construction cost is relatively high, especially for deep aquifers. Construction of such barriers at many sites might not be feasible due to the presence of existing high value structures such as buildings and airport runways. Those shortcomings may have significantly limited the applications of iron permeable reactive barriers.

One solution to the problem of using zero-valent iron particles to remediate ground and groundwater contaminants is set forth in U.S. Pat. No. 7,128,841, the specification of which is incorporated herein by reference.

SUMMARY OF THE INVENTION

The primary goal of this invention was to develop methods and compositions for preparation of zero-valent iron particles that can be highly dispersed with substantial reactivity and high mobility in a groundwater environment. Dispersions of zero-valent iron prepared according to the invention can be injected directly into soil and groundwater for site remediation.

Zero-valent iron, especially ultrafine nanoparticles of zero-valent iron has been shown to be effective for the transformation of a large variety of environmental contaminants. Soy proteins, on the other hand can stabilize and enhance the mobility of the zero-valent iron particles in the subsurface environment. Soy proteins are natural substances, highly digestible and have no known adverse environmental impact. Biodegradation of soy proteins could further promote the growth of naturally occurring microorganisms and therefore accelerate bioremediation of pollutants in soil and groundwater.

As used in the description of the present invention, nanoscale particles are those having an average size less than 100 nanometers.

Therefore in one aspect the present invention is a method for treating contaminated soil and water comprising the steps of preparing a dispersion of zero-valent iron particles having a maximum size of 10 μm in an aqueous solution containing 1 to 3% by weight of one of soy protein, soy milk or other soy derivatives in a dispersion containing 10 g/l nanoscale zero-valent iron particles and applying said zero-valent iron dispersion to said contaminated soil and water.

In another aspect the present invention is a process for treating contaminated soil and water comprising the steps of: preparing a dispersion of nanoscale zero-valent iron particles in an aqueous solution containing 1 to 3% by weight of soy protein is a dispersion containing 10 g/l nanoscale zero-valent iron particles; and applying said zero-valent iron dispersion to said contaminated soil and water.

In yet another aspect the present invention is a process for treating contaminated soil and water comprising the steps of: preparing a dispersion of nanoscale zero-valent iron particles in an aqueous solution containing 1 to 3% by weight of soy milk in a dispersion containing 10 g/l of nanoscale zero-valent iron particles; and applying said zero-valent iron dispersion to said contaminated soil and water.

DETAILED DESCRIPTION OF THE PREFERRED EMBODIMENT(S)

Zero-valent iron nanoparticles are being increasingly used in groundwater remediation and hazardous waste treatment. Numerous studies on the hydrodechlorination of chlorinated hydrocarbons (e.g., chlorinated ethenes, ethanes, and methanes) by the zero-valent iron nanoparticles have been reported. Recent work has expanded the applications to treatment of polychlorinated biphenyls (PCBs), perchlorate, nitrate, heavy metal ions such as hexavalent chromium and arsenic, organochlorine pesticides such as DDT and hexachlorocyclohexanes.

Three core issues must be carefully addressed before this technology can be effectively applied in large scale: (1) synthesis and production of iron nanoparticles in large quantity and at a low cost; (2) understanding the environmental chemistry and contaminant transformation with the iron nanoparticles, especially the effect on water chemistry, generation and accumulation of potential toxic end products, ultimate environment fate; and (3) methods for delivering the nanoparticles to target areas in the subsurface.

Pure ($Fe^0$, or zero-valent) iron is largely an engineered material. For example, chemically pure iron has been produced by hydrogen reduction of iron oxides or hydroxides. Synthesis of iron particles using the borohydride ($BH_4^-$) method has been successfully used in many laboratories. It is also feasible to produce fine iron particles using mechanical attrition. With increasing demand, it is expected that more vendors will enter the market and consequently various ultrafine iron nanoparticles will become available. Nonetheless, cost effective production of highly pure ($Fe^0$, or zero-valent) iron remains a challenge.

Another technical challenge is the transport efficiency of iron particles in the soil and groundwater environment. Iron nanoparticles due to the high surface energy and strong particle-particle interactions (e.g., van der Waals and magnetic) tend to aggregate and form large (e.g., microscale) particles. Groundwater has relatively high ionic strength, which is favorable for the reduction of electric double layer and electrostatic repulsion between particles in water. With a density at 7,800 $kg/m^3$, iron particles and aggregates have relatively high settling velocities. Furthermore, aquifers have very narrow channels for the flow of water ad short settling distances for particle removal. As a result, aquifers have often been referred to as giant filters of colloidal particles. Achieving highly dispersed iron nanoparticles with sustained reactivity and high mobility in the groundwater environment is therefore highly desired.

Conventional approaches such as electrostatic, steric (polymeric), or electrosteric stabilization may be used in the preparation of iron nanoparticles suspensions. Electrostatic repulsion is achieved by increasing the surface charge while steric stabilization is typically accomplished by the adsorption of long-chain organic molecules. Some of these large molecules may also carry charges (e.g., polyelectrolyte), creating electrosteric repulsion with much enhanced colloidal stability. This invention encompasses the preparation of stable zero-valent iron nanoparticles and the efficient injection of iron nanoparticles into porous media.

This invention entails the application proteins derived from soybeans. This work consists of three parts: (1) Preparation of soy protein solution; (2) preparation of iron-soy protein slurry; and (3) use of iron-soy protein slurry.

Soy proteins have been used in Asia for centuries as food, as nutrition sources and as medicines. Soy proteins have been added to many food products to improve their nutritional value. Studies suggest that soy proteins provide all essential amino acids required for human and animal growth and maintenance. Of all vegetable proteins, soy proteins are the most complete, and are close to high quality animal proteins. Human clinical studies have shown that soy proteins have digestibility comparable to high quality protein sources such as milk and meat. In 1999 FDA has approved food manufacturers to label soy proteins and their derivative products stating soy proteins can help reduce the risk of heart diseases.

Soybeans contain large numbers of proteins. The building blocks of proteins are amino acids, which are deprotonated and thus carry negative electric charges in water. Sorption or attachment of soy protein molecules onto the surfaces of iron nanoparticles increase the surface charge and generate electric repulsion among the iron particles. This can reduce the aggregation of iron particles. Furthermore, soil and aquifer materials are negatively charged under neural pH conditions. The soy protein stabilized iron particles thus have lower affinity and sorption potential toward soil and aquifer materials. As a result, the soy protein stabilized iron particles likely remain in water and have higher mobility in the soil and groundwater environment.

Soy proteins can be obtained in the form of powder or solution (soymilk). Soymilk typically has 3-7% of solids. That is, after a soymilk solution is dried, the residual solid is typically in the range of 3-7 grams per liter of soymilk. Soy protein solution can be prepared with dissolution of soy flour in water. Soy flour is quite soluble under room temperature. If 100 g of soy flour is added to 900 mL of water, a soymilk of ~10% is formed. For typical applications, 1-3% soy solution may be needed.

Our research suggests that an aqueous solution containing 1-3% soy proteins is sufficient for the stabilization and transport of 10 g/L nanoscale zero-valent iron particles.

Having thus described my invention what is desired to be secured by Letters Patent of the United States is set forth in the appended claims.

What is claimed is:

1. A method for treating contaminated soil and water comprising the steps of:
    preparing a dispersion of zero-valent iron particles having a maximum size of 10 μm in an aqueous solution containing 1 to 3% by weight of one of soy protein or soy milk in a dispersion containing 10 g/l zero-valent iron particles; and
    applying said zero-valent iron dispersion to said contaminated soil and water.

2. A method according to claim 1 including the steps of:
    preparing said dispersion of zero-valent iron particles in an aqueous solution containing 1 to 3% by weight of soy protein in a dispersion containing 10 g/l zero-valent iron particles.

3. A method according to claim 1 including the steps of:
    preparing a dispersion of zero-valent iron particles in an aqueous solution containing 1 to 3% by weight of soy milk in a dispersion containing 10 g/l of zero-valent iron particles.

4. A method for preparing stable zero-valent nanoscale iron particles comprising the steps of:
    preparation of soy protein molecules; and
    attachment of said soy protein molecules onto surfaces of zero-valent nanoscale iron particles whereby electric repulsion between said nanoscale iron particles is increased.

* * * * *